(12) United States Patent
Juliato et al.

(10) Patent No.: US 12,506,742 B2
(45) Date of Patent: *Dec. 23, 2025

(54) DETECTING CLOCK SYNCHRONIZATION ATTACKS WITH PSEUDO-RANDOMIZATION OF FRAMES IN THE PROTECTED WINDOW

(71) Applicant: INTEL CORPORATION, Santa Clara, CA (US)

(72) Inventors: Marcio Juliato, Portland, OR (US); Javier Perez-Ramirez, North Plains, OR (US); Mikhail Galeev, Beaverton, OR (US); Christopher Gutierrez, Hillsboro, OR (US); Dave Cavalcanti, Portland, OR (US); Manoj Sastry, Portland, OR (US); Vuk Lesi, Cornelius, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/766,326

(22) Filed: Jul. 8, 2024

(65) Prior Publication Data

US 2024/0364702 A1 Oct. 31, 2024

Related U.S. Application Data

(63) Continuation of application No. 17/484,330, filed on Sep. 24, 2021, now Pat. No. 12,034,736.

(51) Int. Cl.
*H04L 9/06* (2006.01)
*H04L 9/40* (2022.01)
*H04L 69/22* (2022.01)
*H04L 69/28* (2022.01)

(52) U.S. Cl.
CPC .......... *H04L 63/105* (2013.01); *H04L 9/0656* (2013.01); *H04L 63/1483* (2013.01); *H04L 69/22* (2013.01); *H04L 69/28* (2013.01)

(58) Field of Classification Search
CPC . H04L 63/105; H04L 9/0656; H04L 63/1483; H04L 69/22; H04L 69/28; H04L 9/0869; H04L 63/0428; H04L 63/1466; H04L 9/12
See application file for complete search history.

(56) References Cited

U.S. PATENT DOCUMENTS

| | | | |
|---|---|---|---|
| 12,034,736 B2* | 7/2024 | Juliato | H04L 63/1483 |
| 2015/0146526 A1* | 5/2015 | Kulkarni | H04L 47/122 |
| | | | 370/230.1 |
| 2019/0245690 A1* | 8/2019 | Shah | H04L 9/3242 |
| 2021/0194922 A1* | 6/2021 | Zinner | H04L 63/1466 |

* cited by examiner

*Primary Examiner* — Baotran N To
(74) *Attorney, Agent, or Firm* — KDW FIRM PLLC

(57) ABSTRACT

Systems and methods to detect attacks on the clocks of devices in time sensitive networks are described. Particularly, the disclosed systems and methods provide detection and mitigation of timing synchronization attacks based on pseudo-random numbers generated and used to select and authenticate timing of transmission of messages in protected transmission windows.

20 Claims, 9 Drawing Sheets

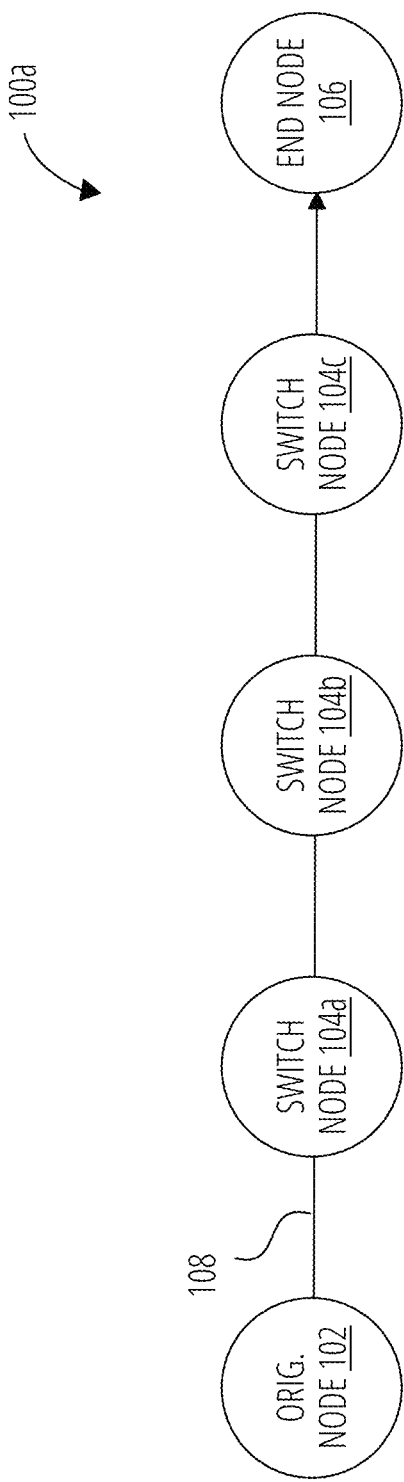
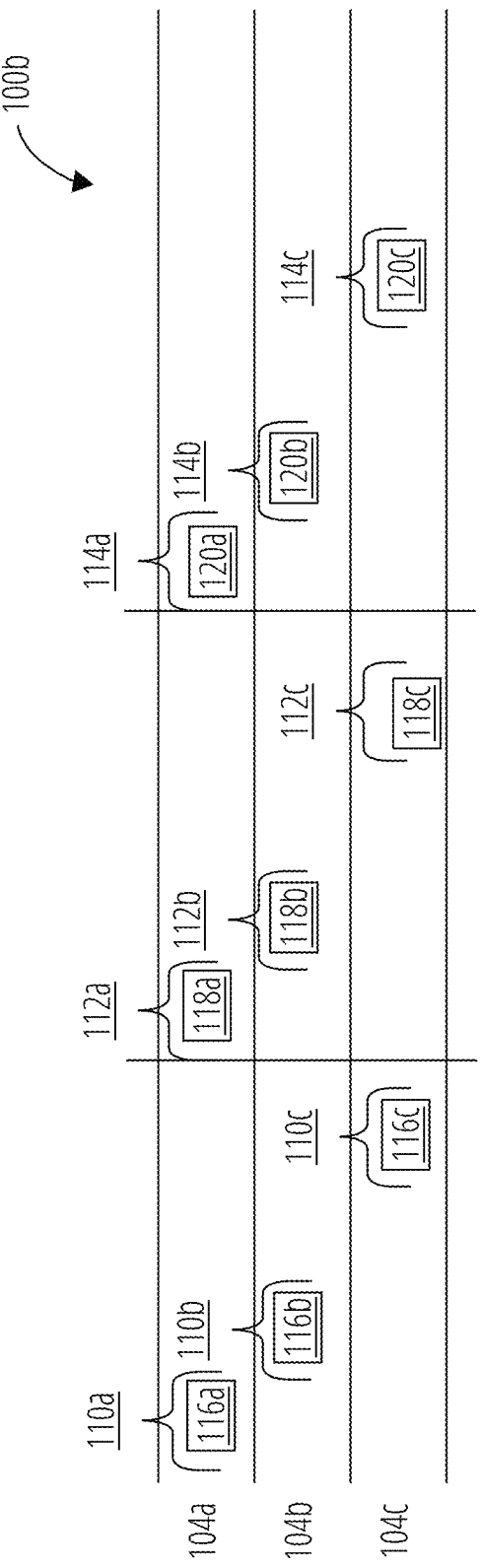
FIG. 1A
FIG. 1B

US 12,506,742 B2

DETECTING CLOCK SYNCHRONIZATION ATTACKS WITH PSEUDO-RANDOMIZATION OF FRAMES IN THE PROTECTED WINDOW

CROSS REFERENCE TO RELATED APPLICATIONS

This application claims priority under 35 USC § 120 from U.S. application Ser. No. 17/484,330, entitled "DETECTING CLOCK SYNCHRONIZATION ATTACKS WITH PSEUDO-RANDOMIZATION OF FRAMES IN THE PROTECTED WINDOW", filed on Sep. 24, 2021, the subject matter of which is incorporated herein by reference.

BACKGROUND

Many computing systems require real-time safety critical features. For example, many autonomous systems, industrial systems, etc., require such systems to have real-time safety-critical features. This often necessitates that time performance within the system has higher levels of security relative to other aspects of the system. For example, factories employ synchronized robots to accomplish coordinated tasks, often in the presence of human beings. In another example, robots utilize coordination to perform surgeries on humans. Yet another example, self-driving vehicles requires synchronization of sensing elements to build a precise perception of the environment around the vehicle, including other vehicles, objects, hazards, and persons. Tools relied on to achieve the necessary time performance, synchronization, and bounded latency communication for such time sensitive systems to perform as needed is often referred to as time-sensitive networking (TSN).

In general, TSN defines a set of standards (and amendments) with the aim to enable time synchronization and deterministic data delivery in converged networks where time-critical (TC) traffic coexists with other types of traffic. Thus, there is a need to provide security for TSN devices to mitigate the risks associated with disruption in TSN operation from attacks on the timing of the network.

BRIEF DESCRIPTION OF THE SEVERAL VIEWS OF THE DRAWINGS

To easily identify the discussion of any element or act, the most significant digit or digits in a reference number refer to the figure number in which that element is first introduced.

FIG. 1A illustrates a network 100a.
FIG. 1B illustrates a timing diagram 100b.
FIG. 2A illustrates network 200a.

DETAILED DESCRIPTION

Figure 2A:
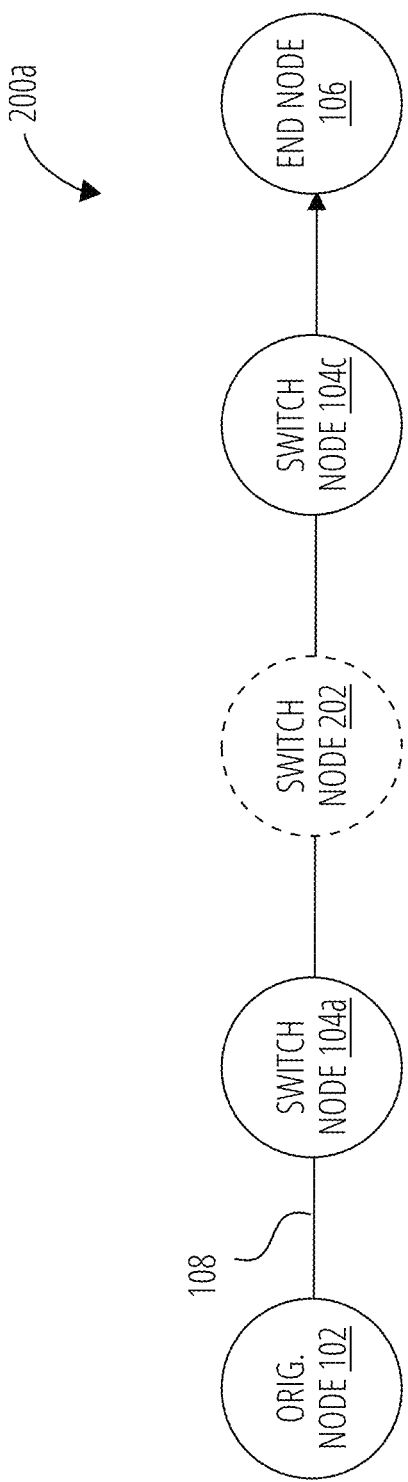

The present disclosure is generally directed to reducing interference or attack vectors for systems operating based on TSN. As noted, TSN defines a set of standards (and amendments) with the aim to enable time synchronization and deterministic data delivery in converged networks where TC traffic coexists with other types of traffic. Various standards have been developed to address time-sensitive communications. Two of the more prominent standards for enabling time-sensitive communications are promulgated by the Institute of Electrical and Electronics Engineers (IEEE). For example, IEEE 802.1AS and IEEE 802.1Qbv provide systems and methods for synchronizing device clocks. IEEE 802.1AS provides a protocol for time synchronization across the network, where time sensitive devices (e.g., followers) synchronize to a leader clock; while IEEE 802.1Qbv provides for prioritizing TC traffic in the network switches using gate-controlled lists (GCLs).

FIG. 1A depicts a network 100a implemented according to a TSN standard (e.g., IEEE 802.1AS, IEEE 802.1Qbv, or the like). As depicted, network 100a includes origination node 102, switch nodes 104a, 104b, and 104c and end node 106, all communicatively coupled via communication channel 108. It is noted that the number of nodes in network 100a is selected for purposes of clarity and not limitation. In practice, network 100a can include any number and combination of nodes (e.g., origination nodes, switches, end devices, etc.). Nodes in network 100a (e.g., origination node 102, switch node 104a, switch node 104b, and switch node 104c, etc.) are provided a GCL table, which specifies timing for windows in which the nodes can transmit packets on communication channel 108.

Switch nodes 104a, 104b, and 104c can be any number of devices in a network arranged to communicate, such as for example, electronic control units in an autonomous vehicle, an industrial system, a medical system, or the like. Additionally, communication channel 108 can be any of a variety of communication channels, including wired or wireless communication channels. In some implementations, all devices in network 100a will receive GCL tables. However, in some implementations, not all nodes will receive a GCL table.

Typically, GCL tables are generated in a network controller (not shown) and are designed to prioritize TC traffic and prevent lower priority traffic from accessing communication channel 108, thus guaranteeing the timely delivery of TC packets within pre-configured time windows. FIG. 1B depicts a timing diagram 100b depicting communication windows (e.g., Qbv windows, or the like) for switches of network 100a based on GCL tables. Timing diagram 100b depicts a number of Qbv windows for multiple time periods in which packets are transmitted. For example, timing diagram 100b depicts Qbv windows 110a, 110b, and 110c in which packets 116a, 116b, and 116c, respectively are transmitted. Additionally, timing diagram 100b depicts Qbv windows 112a, 112b, and 112c in which packets 118a, 118b, and 118c, respectively are transmitted. Lastly, timing diagram 100b depicts Qbv windows 114a, 114b, and 114c in which packets 120a, 120b, and 120c, respectively are transmitted. It is noted that the communication windows referred to herein are referred to as Qbv windows or protected windows for clarity. However, other standard or techniques for forming protected communication windows to facilitate time synchronization can be used besides Qbv windows. Examples are not limited in this context.

To facilitate transmission of packets (e.g., packet 116a, etc.) during protected windows (e.g., Qbv window 110a, etc.), nodes in network 100a are time synchronized and scheduled to transmit TC packets (e.g., packet 116a, etc.) using non overlapping protected windows (e.g., Qbv window 110a, etc.). It is to be appreciated that providing latency bounded communication (e.g., as depicted in timing diagram 100b) requires tight synchronization of time between nodes in network 100a. With such dependency on time synchronization, reliable TSN operation can be disrupted by attacking the timing of the network.

FIG. 2A depicts a network 200a, which is like network 100a except that switch 104b of network 100 is now compromised and depicted as compromised switch node 202. In particular, the clock (not shown) of compromised switch node 202 can be attacked and compromised, thereby causing the Qbv window (e.g., Qbv windows 110b, 112b, and 114b) associated with compromised switch node 202 to be misaligned with respect to, and even overlap with, the protected windows of the other switch nodes in the data stream path (e.g., along communication channel 108).

Figure 2B:
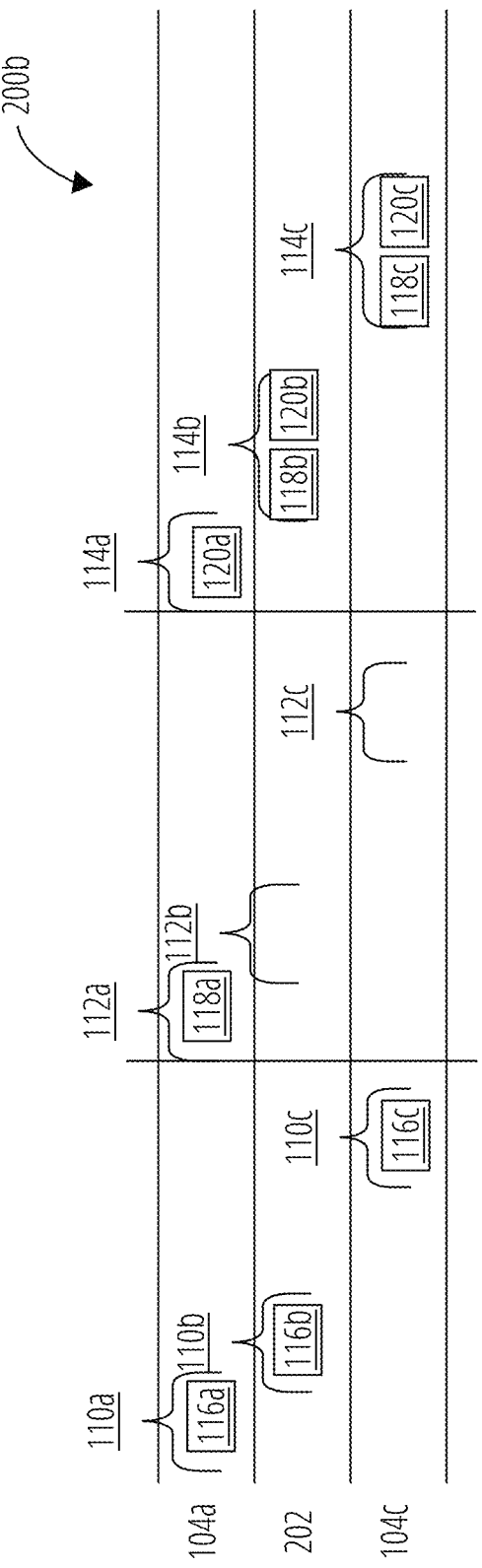
FIG. 2B illustrates timing diagram 200b.

FIG. 2B depicts timing diagram 200b illustrating Qbv windows of compromised switch node 202 misaligned, and overlapping on some cases, with Qbv windows of the other switch nodes (e.g., 104a and 104c). Qbv window 110b is depicted misaligned with Qbv window 110a and Qbv window 110c and overlapping with Qbv window 110a. Likewise, Qbv window 112b is depicted misaligned with Qbv windows 112a and 112c and overlapping with Qbv window 112a. Additionally, Qbv window 114b is depicted misaligned with Qbv windows 114a and 114c and overlapping with Qbv window 114a. As a result, packets (e.g., packet 118a in the figure) arrive too late with respect to the protected window (e.g., Qbv window 112b) of compromised switch 202, causing the associated packet 118b to be buffered and sent in the next protected window (e.g., 114b). As a result of the delay in transmitting packet 118b, compromised switch node 202 breaks the latency bound of the stream that it is serving and can result in errors or comprise the safety of the system in which the nodes are operating.

The present disclosure provides to detect attacks against networks operating under TSN protocols, such as, networks operating in accordance with IEEE 802.1Qbv. In particular, the present disclosure provides systems and methods to detect attacks that directly affect IEEE 802.1Qbv scheduling. In general, the present disclosure provides detection of time synchronization misbehavior in networks operating in accordance with TSN protocols based on attributes associated with a key performance indicator (KPI) or KPIs, or the TSN protocol. The present disclosure uses IEEE 802.1Qbv as the TSN protocol and describes KPIs associated with IEEE 802.1Qbv. However, it is noted that examples described herein can be applied to other TSN protocols different from IEEE 802.1Qbv.

With some examples, systems and methods are described that detect misbehavior of TSN compliant networks based on pseudo-random delay sequence to detect the presence of "man-in-the-middle attacks" (e.g., packet delay, packet injection, etc.). Specifically, two communicating nodes in the TSN (e.g., network 100a, or the like) have a synchronized pseudo-random number generator (PRNG). On the side of the transmitter, a number received from the PRNG determines the transmission delay of the message. On the receiver side, the same number obtained from the PRNG determines the expectation on the arrival time of the message. The message can be placed in a number of different time slots and the alignment of the message with the time slots can be used to detect the presence (or absence) of an attack on the time synchronization of the TSN.

The present disclosure is relevant to various products, such as those that implement TSN capabilities, including Ethernet NICs, Wi-Fi radios, FPGA SOCs, 5G networks components and Edge/Client computing platforms since it provides methods to monitor these new attributes to detect attacks. This method can be instantiated in both software and hardware, which, for example, enables us to deploy it embedded in Intel's silicon applicable to several products as listed above.

The present disclosure provides time synchronization attack detection using pseudo-randomization of timing of messages within protected windows, which facilitates earlier detection (versus conventional techniques) of timing attacks in TSN devices.

Figure 3:
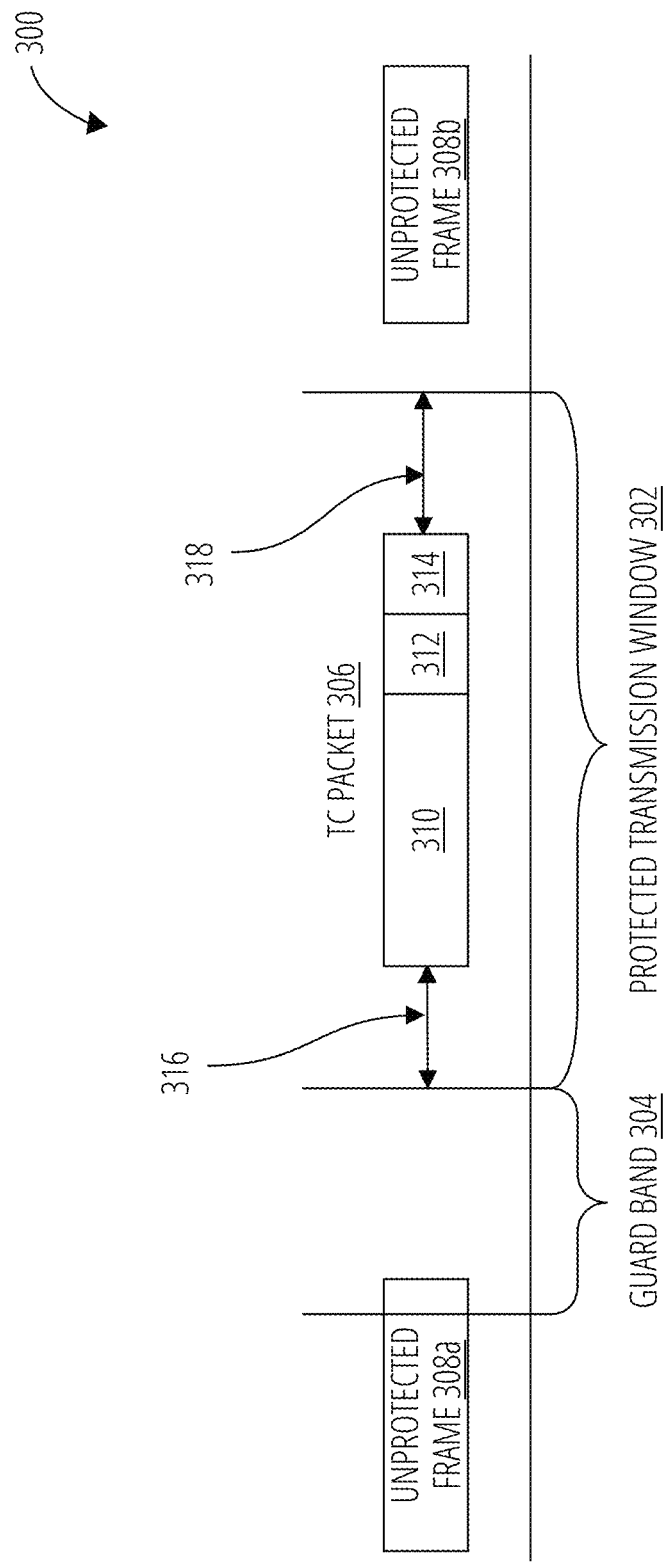
FIG. 3 illustrates a timing diagram 300.

FIG. 3 illustrates an example timing diagram 300 depicting a protected transmission window 302 in which a TC packet 306 is transmitted. Protected transmission window 302 can be based on a GCL table as outlined above. During protected transmission window 302, a device (e.g., origination node 102, switch node 104a, end node 108, or the like) can transmit TC packets, such as TC packet 306. Whereas outside of protected transmission window 302, unprotected frames 308a and/or 308b can be transmitted. Often, protected transmission window 302 can be proceeded by guard band 304. TC packet 306 can include data frame 310, short inter frame spacing 312, and acknowledgment 314.

As introduced above, the present disclosure provides that two communicating nodes (e.g., switch node 104a and switch node 104c, or origination node 102 and end node 108, or the like) have a synchronized pseudo-random number generator (PRNG). On the side of the transmitter (e.g., origination node 102, or the like) a number received from the PRNG determines a transmission delay (described in greater detail below) of the TC packet 306; while on the side of the receiver (e.g., end node 108, or the like) the same number obtained from the PRNG determines the expectation on the arrival time of the TC packet 306. Accordingly, the transmitter can fit the TC packet 306 into a number of different time slots based on the PRNG while the receiver can determine adherence to transmission in the time slot based on the PRNG and thus determine the presence (or absence) of a time synchronization attack.

In general, the transmitter can delay transmission of TC packet 306 based on a delay time 316 (DT), which equals the time the protected transmission window 302 starts ($TW_{start}$) minus the time the TC packet 306 starts ($T_{start}$) or said differently the delay between the start of protected transmission window 302 and the start of TC packet 306. The transmitter can further control a time buffer 318 (TB), which equals the time the protected transmission window 302 ends ($TW_{end}$) minus the time the TC packet 306 ends ($T_{end}$) or said differently the delay between the end of the TC packet 306 and the end of protected transmission window 302 time buffer (TB)).

Figure 4:
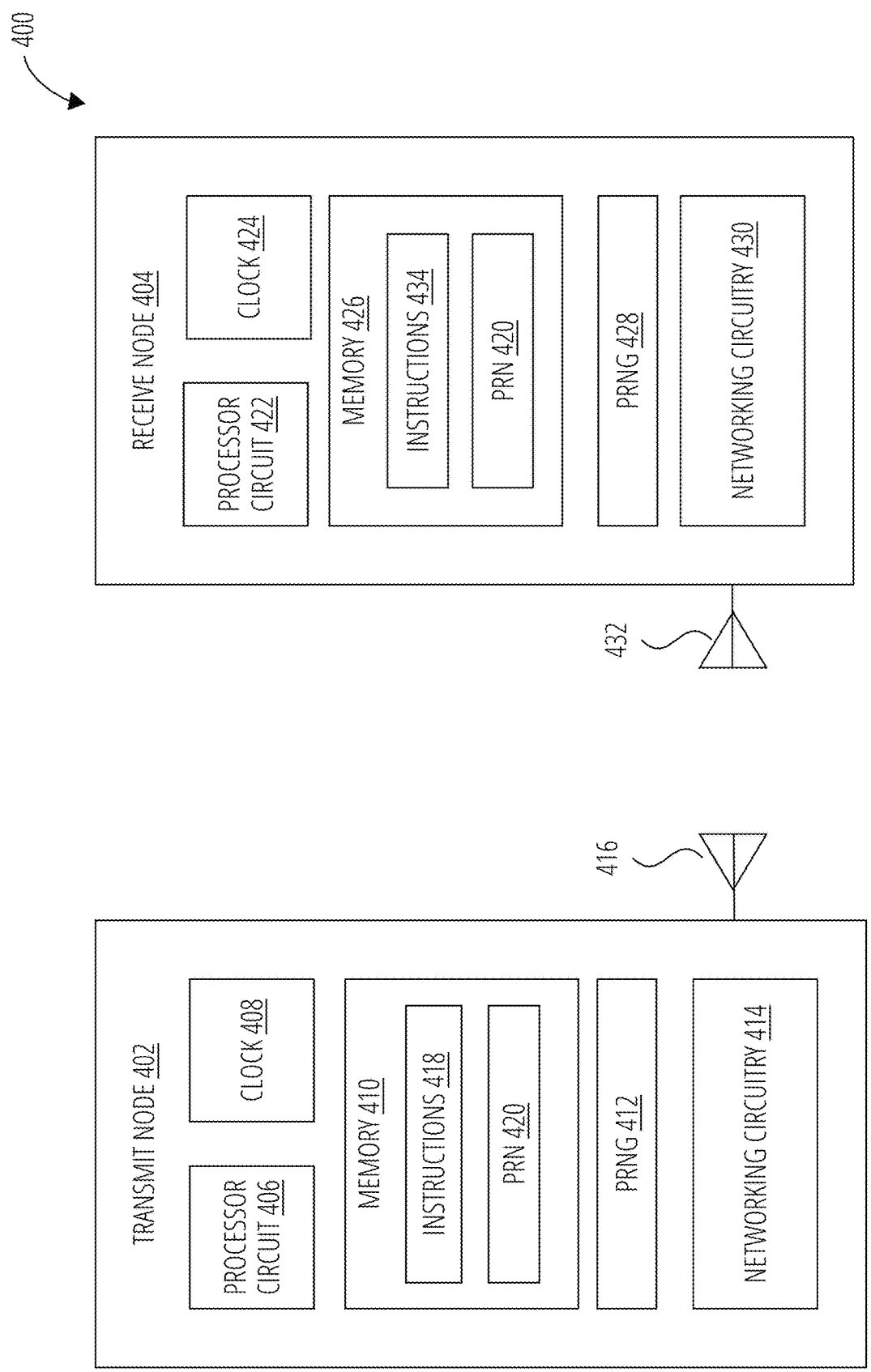
FIG. 4 illustrates a switch node 400 (deleted).

FIG. 4 depict a system 400 including transmit node 402 and receive node 404 arranged to communicate messages based on a TSN protocol as outlined herein. In particular, transmit node 402 and receive node 404 can be ones of nodes depicted in FIG. 1A. As a specific example transmit node 402 can be representative of origination node 102 while receive node 404 can be representative of end node 108. As another example, transmit node 402 can be representative of switch node 104a while receive node 404 can be representative of switch node 104c. In general, transmit node 402 and receive node 404 can be arranged to transmit messages having a delay time 316 and/or time buffer 318 based on a PRNG which is synchronized between the transmit node 402 and receive node 404.

Transmit node 402 includes a processor circuit 406, a clock 408, memory 410, PRNG 412, networking circuitry 414, and an antenna 416. Memory 410 stores instructions 418 and PRN 420. During operation, processor circuit 406 can execute instructions 418 to cause transmit node 402 to determine PRN 420 from PRNG 412. Likewise, processor circuit 406 can execute instructions 418 to cause transmit node 402 to transmit a message (e.g., TC packet 306) having a delay time 316 and/or 318 based on the PRN 420.

Similarly, receive node 404 includes a processor circuit 422, a clock 424, memory 426, PRNG 428, networking circuitry 430, and an antenna 432. Memory 426 stores instructions 434 and PRN 420. During operation, processor circuit 422 can execute instructions 434 to cause receive node 404 to determine PRN 420 from PRNG 428. Likewise, processor circuit 422 can execute instructions 434 to cause receive node 404 to determine whether a message (e.g., TC packet 306) is transmitted with a delay time 316 and/or 318 based on the PRN 420.

It is noted that although transmit node 402 and receive node 404 are depicted wirelessly coupled via antennas 416 and 432, implementations can be wired as well as wireless. For example, antennas 416 and 432 can be replaced with wired networking interconnects to facilitate a wired connection between networking circuitry 414 and 430.

In some examples, PRNG 412 and PRNG 428 are cryptographic pseudo-random number generators (PRNGs) and are arranged to generate synchronized pseudo-random numbers (e.g., PRN 420, or the like) independently from each other. Transmit node 402 can be arranged to transmit a message (e.g., TC packet 306) having a delay time 316 based on the PRN 420, a time buffer 318 based on the PRN 420, or both 316 and time buffer 318 based on PRN 420. Furthermore, the delay time 316 and/or time buffer 318 can vary provided that the protected transmission window 302 is not violated.

Figure 5:
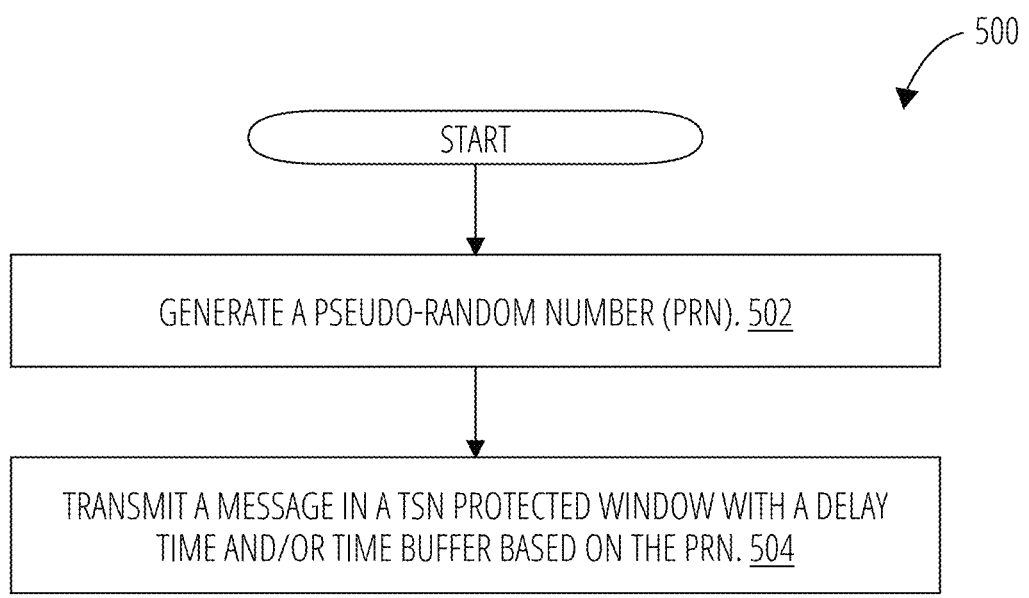
FIG. 5 illustrates a logic flow 500.

FIG. 5 illustrates a logic flow 500 that can be implemented by a transmitting device (e.g., origination node 102, switch node 104a, transmit node 402, etc.) to provide for detection of timing attacks, in accordance with non-limiting example(s) of the present disclosure. Logic flow 500 can begin at block 502 "generate a pseudo-random number (PRN)" where a PRN can be generated. For example, processor circuit 406 can execute instructions 418 to generate a PRN 420 via PRNG 412.

Continuing to block 504 "transmit a message in a TSN protected window with a delay time and/or time buffer based on the PRN" a message can be transmitted in a TSN protected window with a delay time (DT) and/or a time buffer (TB) based on the PRN. For example, processor circuit 406 can execute instructions 418 to cause transmit node 402 to transmit a message (e.g., TC packet 306) in a TSN protected window, or Qbv window (e.g., protected transmission window 302) with a DT (e.g., delay time 316) and/or a TB (e.g., time buffer 318) based on the PRN 420.

It is important to note that a mapping exists between the PRN (e.g., generated at block 502) and the DT and/or TB. However, the actual delay slot (e.g., refer to FIGS. 7A and 7B) does not necessarily need to have an actual 1:1 correlation to the PRN. That is, a mapping between the PRB and the delay can exist and be agreed upon by the communicating parties (e.g., origination node 102 and end node 106, or the like). The mapping can be randomized and/or can be dynamic (e.g., change over time).

Figure 6:
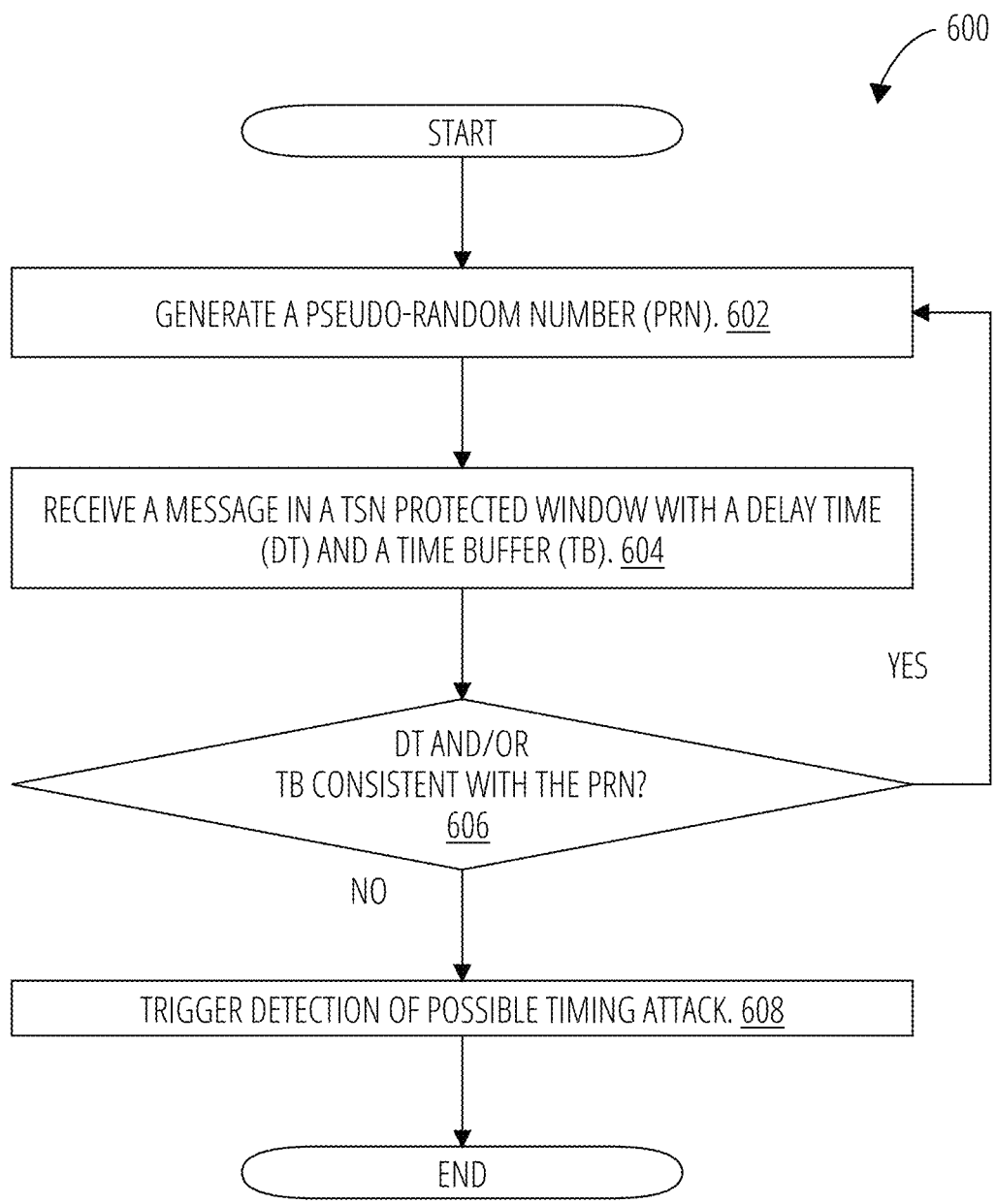
FIG. 6 illustrates a logic flow 500.

FIG. 6 illustrates a logic flow 500 that can be implemented by a receiving device (e.g., end node 108, switch node 104c, receive node 404, etc.) to receive a message and detect potential timing synchronization attacks, in accordance with non-limiting example(s) of the present disclosure. Logic flow 600 can begin at block 602 "generate a pseudo-random number (PRN)" where a PRN can be generated. For example, processor circuit 422 can execute instructions 434 to generate a PRN 420 via PRNG 428.

Continuing to block 604 "receive a message in a TSN protected window with a delay time (DT) and a time buffer (TB)" a message is received in a TSN protected window with a DT and a TB. For example, processor circuit 422 can execute instructions 434 to cause receive node 404 to receive a message (e.g., TC packet 306) in a TSN protected window, or Qbv window (e.g., protected transmission window 302) where the message is transmitted with a DT (e.g., delay time 316) and a TB (e.g., time buffer 318) relative to the protected window.

Continuing to decision block 606 "DT and/or TB consistent with the PRN" a determination is made as to whether the DT and/or the TB is consistent with the PRN. For example, processor circuit 422 can execute instructions 434 to determine whether the DT (e.g., delay time 316) and/or the TB (e.g., time buffer 318) associated with the message (e.g., TC packet 306) received at block 604 is consistent with the PRN generated at block 602. It is noted that the order of block 602 and 604 can be reversed where a packet can be received and then a PRN generated to check the packet timing. This is explained in greater detail below.

From decision block 606, logic flow 600 can continue to block 608 or can return to block 602. For example, logic flow 600 can continue from decision block 606 to block 608 based on a determination that the DT and/or the TB is not consistent with the PRN while logic flow 600 can return to block 602 from decision block 606 based on a determination that the DT and/or the TB is consistent with the PRN.

At block 608 "trigger detection of possible timing attack" an alert of a possible timing synchronization attack can be triggered. For example, processor circuit 422 can execute instructions 434 to generate an alert indicating that a possible timing synchronization attack is detected. In some examples, processor circuit 422 can execute instructions 434 to send the alert or an indication of the alert to a management entity of the TSN of devices in which receive node 404 is operating.

Figure 7A:
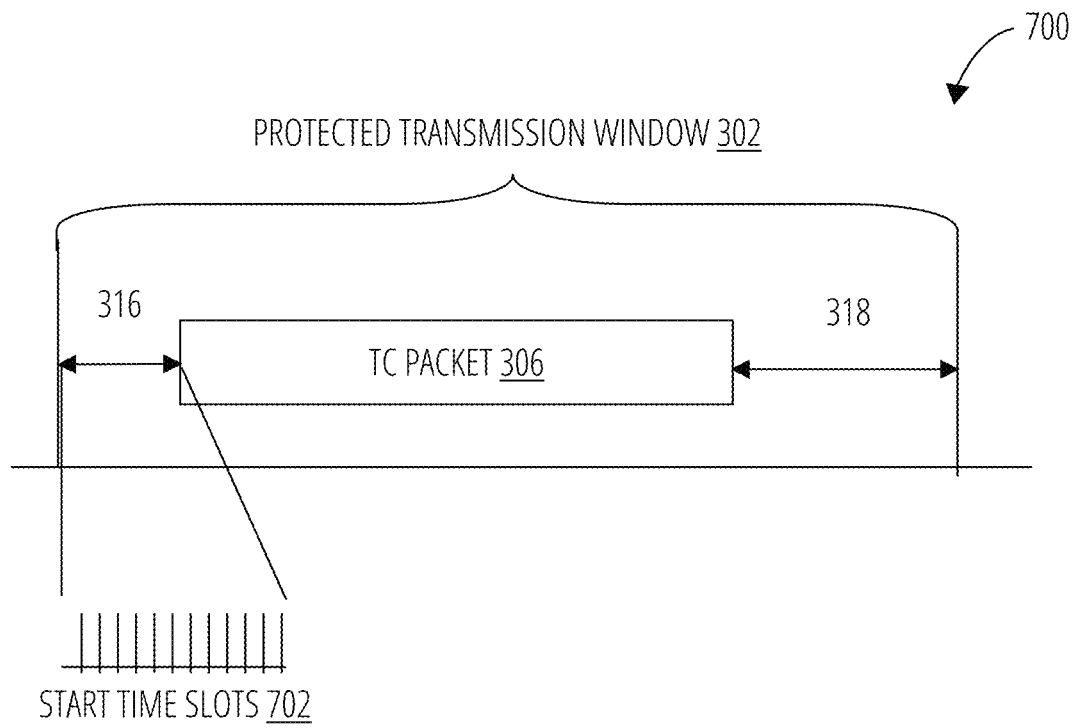
FIG. 7A illustrates an aspect of the subject matter in accordance with one embodiment.

FIG. 7A illustrates a timing diagram 700 showing the DT and TB of a message transmitted a protected window, in accordance with non-limiting example(s) of the present disclosure. For example, this figure depicts TC packet 306 transmitted in protected transmission window 302 with delay time 316 and time buffer 318. Further, this figure depicts start time slots 702 associated with delay time 316.

As outlined above, transmit node 402 can transmit messages, for example, based on logic flow 500 where the start of the transmission of TC packet 306 will not start at the beginning protected transmission window 302. That is, transmit node 402 inserts a random delay based on PRN 420 to cause the start of the transmission of TC packet 306 within the protected transmission window 302 to coincide with one of start time slots 702. As such, delay time 316 will be based on the PRN. It is noted that the granularity and number of possible start time slots 702 can be configured following the functional and security requirements of the TSN system or end application.

Given the added randomness associated with the PRN 420, each transmission of a message (e.g., TC packet 306) starts in a different point in time within the protected transmission window 302, which makes it infeasible to be replicated by an entity that does not have access to the PRN 420. In this manner, the same PRN (e.g., PRN 420) is generated by the transmitter (e.g., transmit node 402) and receiver (receive node 404) and transmission of the message beginning at one of start time slots 702 can be made based on the PRN 420 and also validated, by the receiving entity, based on the PRN 420.

Figure 7B:
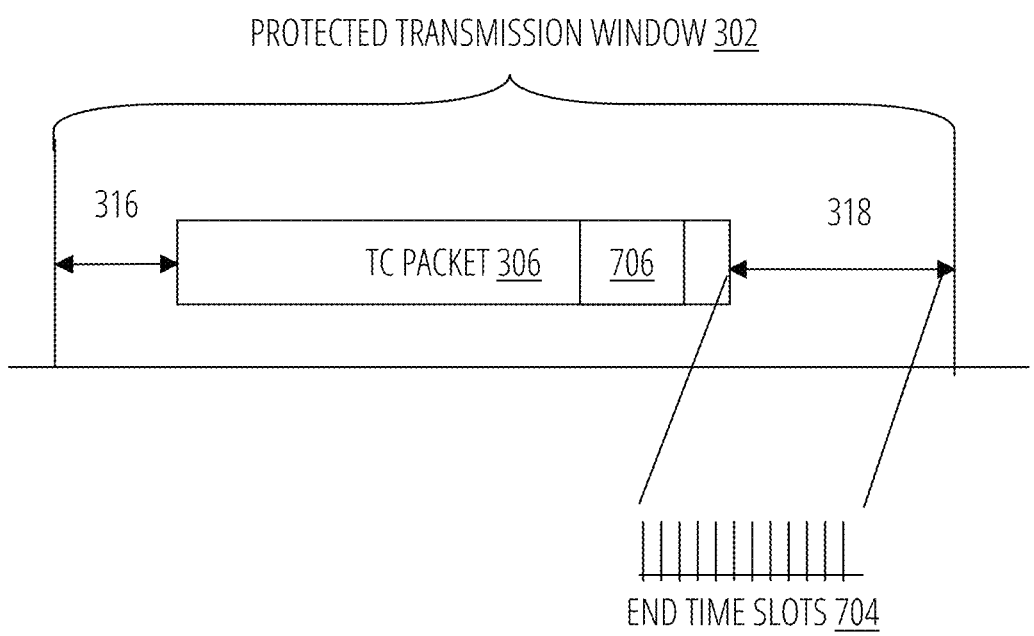
FIG. 7B illustrates an aspect of the subject matter in accordance with one embodiment.

FIG. 7B illustrates timing diagram 700 showing the DT and TB of a message transmitted a protected window, in accordance with non-limiting example(s) of the present disclosure. As outlined above, transmit node 402 can transmit messages, for example, based on logic flow 500 where the time buffer 318 of TC packet 306 relative to protected transmission window 302 is based on PRN 420. More specifically, the timing of the end of the TC packet 306 within protected transmission window 302 can be selected to coincide with end time slots 704 based on the PRN. It is noted that the granularity and number of possible end time slots 704 can be configured following the functional and security requirements of the TSN system or end application.

It is noted that often the TC packet 306 typically ends with acknowledgment 314. The present disclosure provides that the length of size of TC packet 306 is modified based on the PRN 420 such that the end of TC packet 306 coincides with the desired 704. In some examples, the TC packet 306 can be modified by adding a number of bits (e.g., added bits 706), which can be 0s, 1s, or random bits. In a specific example, TC packet 306 can be modified by inserting added bits 706 based on PRN 420. As such, in addition to validating the TC packet 306 based on end time slots 704 of time buffer 318, the receiver (e.g., receive node 404) can validate the TC packet 306 based on the added bits 706.

Figure 8:
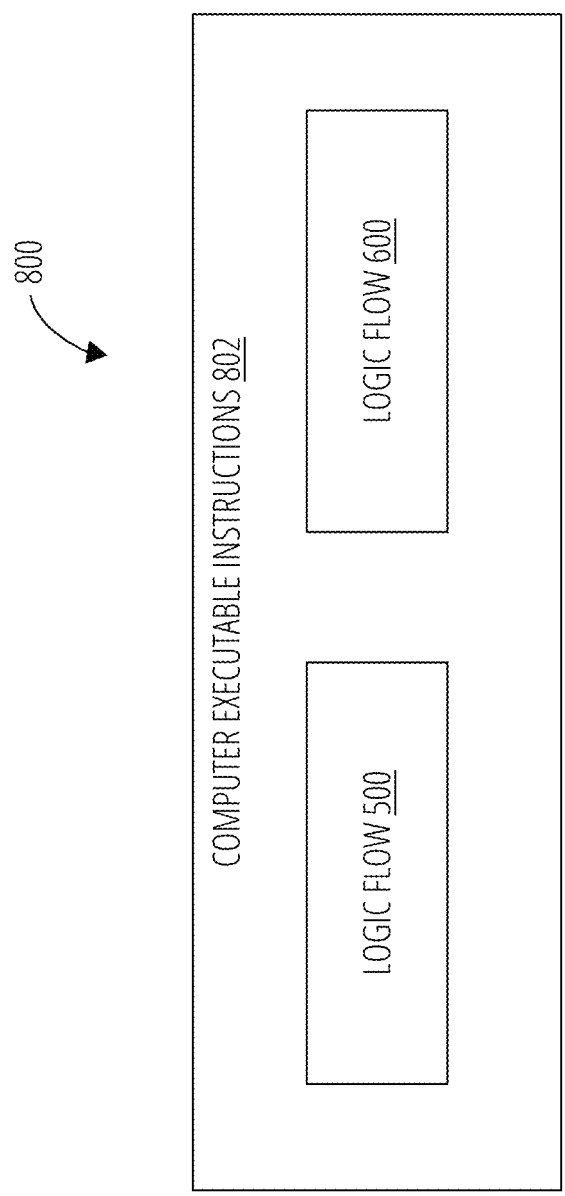
FIG. 8 illustrates a computer-readable storage medium 800.

FIG. 8 illustrates computer-readable storage medium 800. Computer-readable storage medium 800 may comprise any non-transitory computer-readable storage medium or machine-readable storage medium, such as an optical, magnetic or semiconductor storage medium. In various embodiments, computer-readable storage medium 800 may comprise an article of manufacture. In some embodiments, computer-readable storage medium 800 may store computer executable instructions 802 with which circuitry (e.g., processor circuit 406, processor circuit 422, PRNG 412, PRNG 428, radio circuitry 414, radio circuitry 430, or the like) can execute. For example, computer executable instructions 802 can include instructions to implement operations described with respect to logic flow 500. As another example, computer executable instructions 802 can include instructions to implement operations described with respect to logic flow 600. Examples of computer-readable storage medium 800 or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions 802 may include any suitable type of code, such as source code, compiled code, interpreted code, executable code, static code, dynamic code, object-oriented code, visual code, and the like.

As outlined, the present disclosure provides techniques to determine or identify time synchronization attacks based on synchronized PRNGs. The present techniques can be implemented by circuitry and/or implemented in instructions executable by circuitry in a variety of systems, such as, for example, Ethernet network interface cards, Wi-Fi radios, field programmable gate array (FPGA) system-on-chips (SOCs), 5G networks components, autonomous vehicles, or Edge/Client computing platforms. As such an example system using autonomous vehicles is provided.

Figure 9:
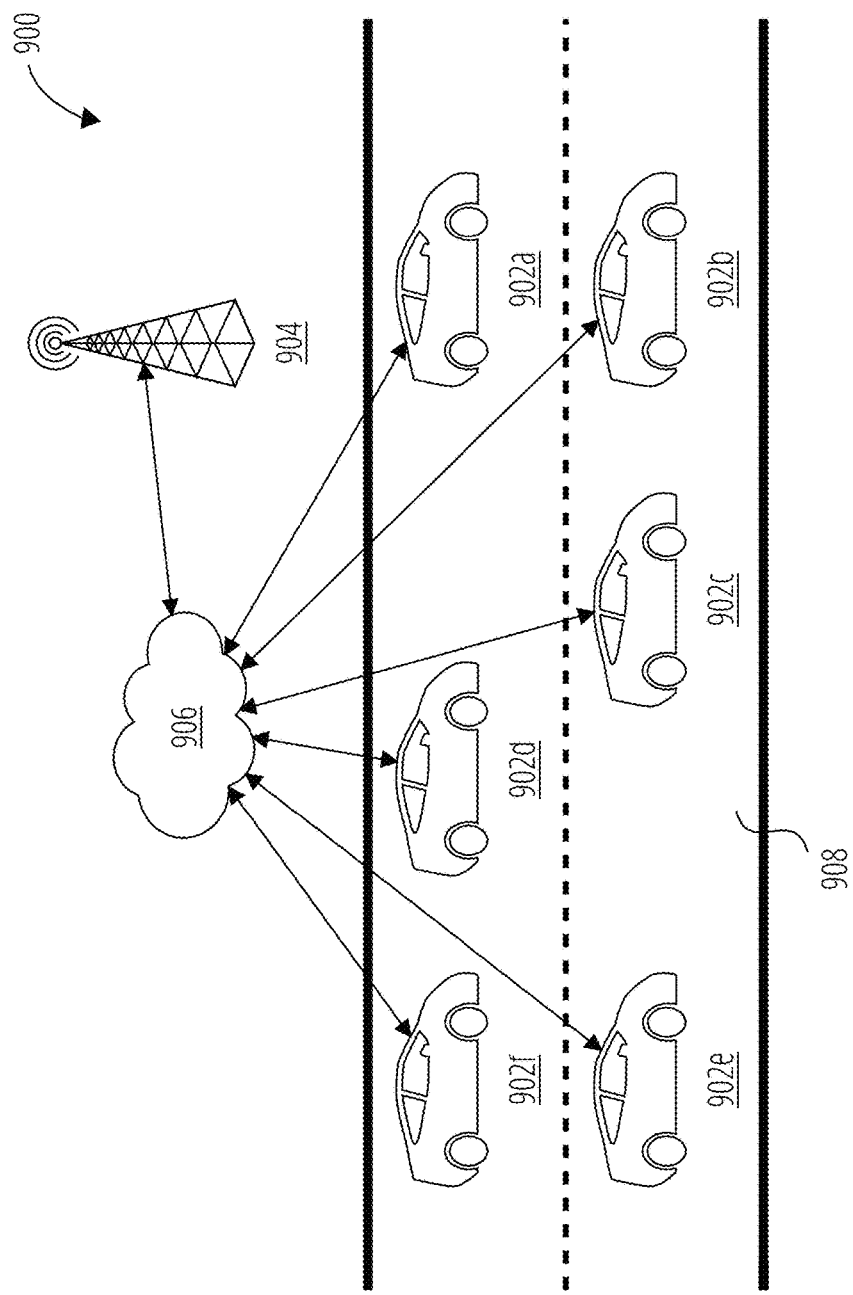
FIG. 9 illustrates a system 900.

FIG. 9 illustrates a system 900 including a number of connected vehicles, such as vehicle 902a, vehicle 902b, vehicle 902c, vehicle 902d, vehicle 902e, and vehicle 902f. Vehicle 902a to vehicle 902f are depicted traveling on a roadway 908 with a roadside unit (RSU) 904 adjacent to the roadway 908. Although these figures illustrate the RSU 904 being arranged at a side of the roadway 908, it may be understood that the RSU 904 may be arranged anywhere (e.g., top, bottom, etc.) near the roadway 908 or in any fashion that allows the RSU 904 to communicate with the vehicles (and vice versa). RSU 904 may be mobile (e.g., one of vehicles, or the like) and travel on roadway 908 with the vehicles. Moreover, it may be understood that vehicles 902a to vehicle 902f may not be limited to motor-based vehicles (e.g., gas, diesel, electric), but may be any suitable vehicle configured to perform vehicle-to-vehicle (V2V) and/or vehicle-to-anything (V2X) communication, such as railed vehicles (e.g., trains, trams), watercraft (e.g., ships, boats), aircraft (airplanes, spaceships, satellites, etc.) and the like.

Vehicle 902a to vehicle 902f and RSU 904 can communicate with each other over network 906. In general, communication between devices (e.g., vehicle 902a to vehicle 902f and RSU 904, or the like) can be facilitated by RSU 904 acting as a routing node for network 906. For example, RSU 904 can provide network 906 to facilitate a Wi-Fi communication scheme. Said differently, vehicle 902a to vehicle 902f and RSU 904 can be arranged to communicate in compliance with one or more standards, and for example, send messages via network 906 where network 906 operates based on one or more standards. For example, the communication schemes of the present disclosure, may be based on one or more communication standards, such as, for example, one of the 802.1 or 802.11 standards promulgated by the Institute of Electrical and Electronic Engineers (IEEE), cellular and long-term evolution (LTE) standards promulgated by the $3^{rd}$ Generation Partnership Project (3GPP). Additionally, the messages communicated via network 906 may be based on one or more standards, such as, SAE J2735, which defines BSM, among other messages.

During operation, vehicle 902a to vehicle 902f and/or RSU 904 can be arranged to transmit (e.g., via network 906, or the like) information elements comprising indications of data related to travel on roadway 908 (e.g., vehicle platoon information, autonomous vehicle information roadway safety information, etc.). As a specific example, vehicle 902b can transmit a message via network 906 including indications of data (e.g., speed of vehicle 902b, trajectory of vehicle 902b, position of vehicle 902b, acceleration of vehicle 902b, etc.). Other ones of the vehicles (e.g., vehicle 902a, vehicle 902c, etc.) or RSU 904 can receive the message transmitted by vehicle 902b via network 906. As another example, the devices (e.g., RSU 904, vehicle 902a, etc.) can be arranged to send and receive basic safety messages (BSM), cooperative awareness messages (CAM), decentralized environmental notification messages (DENM), or the like via network 906.

Within system 900, ones of the vehicles 902a, 902b, etc., can be provided with synchronized PRNGs and can subsequently transmit, receive, and validate timing of messages in a Qbv window with a DT and/or TB based on PRNs generated at each device.

The following examples pertain to further embodiments, from which numerous permutations and configurations will be apparent.

Example 1. A computing-implemented method, comprising: generating a pseudo-random number (PRN); transmitting a message during a protected transmission window of a data stream based on the PRN, a plurality of switching nodes communicating via the data stream, wherein a one of the plurality of switching nodes can independently generate the PRN.

Example 2. The computing-implemented method of example 1, transmitting the message during the protected transmission window of the data stream based on the PRN comprising: identifying a delay time (DT) of a plurality of DTs based on the PRN; and initiating, at the DT of the plurality of DTs, transmission of the message during the protected transmission window.

Example 3. The computing-implemented method of example 1, transmitting the message during the protected transmission window of the data stream based on the PRN comprising: identifying a time buffer (TB) of a plurality of TBs based on the PRN; and transmitting the message during the protected transmission window such that the message transmission ends at the TB of the plurality of TBs.

Example 4. The computing-implemented method of example 3, transmitting the message during the protected transmission window such that the message transmission ends at the TB of the plurality of TBs comprising inserting extra bits into the message.

Example 5. The computing-implemented method of example 4, wherein the extra bits are a random sequence of bits based on the PRN.

Example 6. The computing-implemented method of example 1, wherein the data stream is established in accordance with the Institute of Electrical and Electronics Engineers (IEEE) 802.1AS and/or 802.1Qbv standards.

Example 7. A computing-implemented method, comprising: receiving a message during a protected transmission window of a data stream; generating a pseudo-random number (PRN); authenticating the message based on the PRN.

Example 8. The computing-implemented method of example 7, authenticating the message based on the PRN comprising: determining a delay time (DT) of a plurality of DTs of the message relative to the protected transmission window; determining whether the DT of the plurality of DTs is authentic based on the PRN.

Example 9. The computing-implemented method of example 7, authenticating the message based on the PRN comprising: identifying a time buffer (TB) of a plurality of TBs of the message relative to the protected transmission window; and determining whether the TB of the plurality of TBs is authentic based on the PRN.

Example 10. The computing-implemented method of example 7, authenticating the message based on the PRN comprising: generating a random sequence of bits based on the PRN; determining whether the message comprises the random sequence of bits.

Example 11. The computing-implemented method of example 7, authenticating the message based on the PRN comprising: determining whether the timing of the message transmission relative to the protected transmission window is authentic based on the PRN; and generating an alert of a possible timing synchronization attack based on a determination that the timing of the message transmission relative to the protected transmission window is not authentic.

Example 12. The computing-implemented method of example 7, wherein the data stream is established in accordance with the Institute of Electrical and Electronics Engineers (IEEE) 802.1AS and/or 802.1Qbv standards.

Example 13. A computing apparatus comprising: a processor; and a memory storing instructions that, when executed by the processor, configure the apparatus to: generate a pseudo-random number (PRN); transmit a message during a protected transmission window of a data stream based on the PRN, a plurality of switching nodes communicating via the data stream, wherein a one of the plurality of switching nodes can independently generate the PRN.

Example 14. The computing apparatus of example 13, the instructions when executed by the processor configure the apparatus to: identify a delay time (DT) of a plurality of DTs based on the PRN; and initiate, at the DT of the plurality of DTs, transmission of the message during the protected window.

Example 15. The computing apparatus of example 13, the instructions when executed by the processor configure the apparatus to: identify a time buffer (TB) of a plurality of TBs based on the PRN; and transmit the message during the protected transmission window such that the message transmission ends at the TB of the plurality of TBs.

Example 16. The computing apparatus of example 15, the instructions when executed by the processor configure the apparatus to insert extra bits into the message.

Example 17. The computing apparatus of example 16, wherein the extra bits are a random sequence of bits based on the PRN.

Example 18. The computing apparatus of example 13, wherein the data stream is established in accordance with the Institute of Electrical and Electronics Engineers (IEEE) 802.1AS and/or 802.1Qbv standards.

Example 19. A non-transitory computer-readable storage medium, the computer-readable storage medium including instructions that when executed by circuitry of a computer, cause the computer to: receive a message during a protected transmission window of a data stream; generate a pseudo-random number (PRN); authenticate the message based on the PRN.

Example 20. The non-transitory computer-readable storage medium of example 19, the instructions when executed by the circuitry of the computer cause the computer to: determine a delay time (DT) of a plurality of DTs of the message relative to the protected transmission window; determine whether the DT of the plurality of DTs is authentic based on the PRN.

Example 21. The non-transitory computer-readable storage medium of example 19, the instructions when executed by the circuitry of the computer cause the computer to: identify a time buffer (TB) of a plurality of TBs of the message relative to the protected transmission window; and determine whether the TB of the plurality of TBs is authentic based on the PRN.

Example 22. The non-transitory computer-readable storage medium of example 19, the instructions when executed by the circuitry of the computer cause the computer to: generate a random sequence of bits based on the PRN; determine whether the message comprises the random sequence of bits.

Example 23. The non-transitory computer-readable storage medium of example 19, the instructions when executed by the circuitry of the computer cause the computer to: determine whether the timing of the message transmission relative to the protected transmission window is authentic based on the PRN; and generate an alert of a possible timing synchronization attack based on a determination that the timing of the message transmission relative to the protected transmission window is not authentic.

Example 24. The non-transitory computer-readable storage medium of example 19, wherein the data stream is established in accordance with the Institute of Electrical and Electronics Engineers (IEEE) 802.1AS and/or 802.1Qbv standards.

Example 25. An apparatus comprising: means for generating a pseudo-random number (PRN); means for transmitting a message during a protected transmission window of a data stream based on the PRN, a plurality of switching nodes communicating via the data stream, wherein a one of the plurality of switching nodes can independently generate the PRN.

Example 26. The apparatus of example 25, comprising: means for identifying a delay time (DT) of a plurality of DTs based on the PRN; and means for initiating, at the DT of the plurality of DTs, transmission of the message during the protected transmission window.

Example 27. The apparatus of example 25, comprising: means for identifying a time buffer (TB) of a plurality of TBs based on the PRN; and means for transmitting the message during the protected transmission window such that the message transmission ends at the TB of the plurality of TBs.

Example 28. The apparatus of example 27, comprising means for inserting extra bits into the message.

Example 29. The apparatus of example 28, wherein the extra bits are a random sequence of bits based on the PRN.

Example 30. The apparatus of example 25, wherein the data stream is established in accordance with the Institute of Electrical and Electronics Engineers (IEEE) 802.1AS and/or 802.1Qbv standards.

Example 31. An apparatus, comprising: means for receiving a message during a protected transmission window of a data stream; means for generating a pseudo-random number (PRN); and means for authenticating the message based on the PRN.

Example 32. The apparatus of example 31, comprising: means for determining a delay time (DT) of a plurality of DTs of the message relative to the protected transmission window; and means for determining whether the DT of the plurality of DTs is authentic based on the PRN.

Example 33. The apparatus of example 31, comprising: means for identifying a time buffer (TB) of a plurality of TBs of the message relative to the protected transmission window; and means for determining whether the TB of the plurality of TBs is authentic based on the PRN.

Example 34. The apparatus of example 31, comprising: means for generating a random sequence of bits based on the PRN; and means for determining whether the message comprises the random sequence of bits.

Example 35. The apparatus of example 31, comprising: means for determining whether the timing of the message transmission relative to the protected transmission window is authentic based on the PRN; and means for generating an alert of a possible timing synchronization attack based on a determination that the timing of the message transmission relative to the protected transmission window is not authentic.

Example 36. The apparatus of example 31, wherein the data stream is established in accordance with the Institute of Electrical and Electronics Engineers (IEEE) 802.1AS and/or 802.1Qbv standards.

Example 37. A non-transitory computer-readable storage medium, the computer-readable storage medium including instructions that when executed by circuitry of a computer, cause the computer to: generate a pseudo-random number (PRN); transmit a message during a protected transmission window of a data stream based on the PRN, a plurality of switching nodes communicating via the data stream, wherein a one of the plurality of switching nodes can independently generate the PRN.

Example 38. The non-transitory computer-readable storage medium of example 37, the instructions when executed by the circuitry of the computer cause the computer to: identify a delay time (DT) of a plurality of DTs based on the PRN; and initiate, at the DT of the plurality of DTs, transmission of the message during the protected window.

Example 39. The non-transitory computer-readable storage medium of example 38, the instructions when executed by the circuitry of the computer cause the computer to: identify a time buffer (TB) of a plurality of TBs based on the PRN; and transmit the message during the protected transmission window such that the message transmission ends at the TB of the plurality of TBs.

Example 40. The non-transitory computer-readable storage medium of example 39, the instructions when executed by the circuitry of the computer cause the computer to insert extra bits into the message.

Example 41. The non-transitory computer-readable storage medium of example 40, wherein the extra bits are a random sequence of bits based on the PRN.

Example 42. The non-transitory computer-readable storage medium of example 39, wherein the data stream is established in accordance with the Institute of Electrical and Electronics Engineers (IEEE) 802.1AS and/or 802.1Qbv standards.

Example 43. A computing apparatus comprising: a processor; and a memory storing instructions that, when executed by the processor, configure the apparatus to: receive a message during a protected transmission window of a data stream; generate a pseudo-random number (PRN); and authenticate the message based on the PRN.

Example 44. The computing apparatus of example 43, the instructions when executed by the processor configure the apparatus to: determine a delay time (DT) of a plurality of DTs of the message relative to the protected transmission window; determine whether the DT of the plurality of DTs is authentic based on the PRN.

Example 45. The computing apparatus of example 43, the instructions when executed by the circuitry of the computer cause the computer to: identify a time buffer (TB) of a plurality of TBs of the message relative to the protected transmission window; and determine whether the TB of the plurality of TBs is authentic based on the PRN.

Example 46. The computing apparatus of example 43, the instructions when executed by the circuitry of the computer cause the computer to: generate a random sequence of bits based on the PRN; determine whether the message comprises the random sequence of bits.

Example 47. The computing apparatus of example 43, the instructions when executed by the circuitry of the computer cause the computer to: determine whether the timing of the message transmission relative to the protected transmission window is authentic based on the PRN; and generate an alert of a possible timing synchronization attack based on a determination that the timing of the message transmission relative to the protected transmission window is not authentic.

Example 48. The computing apparatus of example 43, wherein the data stream is established in accordance with the Institute of Electrical and Electronics Engineers (IEEE) 802.1AS and/or 802.1Qbv standards.

What is claimed is:
1. A computing apparatus comprising:
a processor circuitry; and
a memory storing instructions that, when executed by the processor circuitry, causes the processor circuitry to:

receive a message during a protected transmission window of a data stream, wherein the protected transmission window is a communication window in which the message is transmitted;
generate a pseudo-random number (PRN); and
authenticate the message based on the PRN.

2. The computing apparatus of claim 1, the instructions when executed by the processor circuitry causes the processor circuitry to:
determine a delay time (DT) of a plurality of DTs of the message relative to the protected transmission window; and
determine whether the DT of the plurality of DTs is authentic based on the PRN.

3. The computing apparatus of claim 1, the instructions when executed by the processor circuitry causes the processor circuitry to:
identify a time buffer (TB) of a plurality of TBs of the message relative to the protected transmission window; and
determine whether the TB of the plurality of TBs is authentic based on the PRN.

4. The computing apparatus of claim 1, the instructions when executed by the processor circuitry causes the processor circuitry to:
generate a random sequence of bits based on the PRN; and
determine whether the message comprises the random sequence of bits.

5. The computing apparatus of claim 1, the instructions when executed by the processor circuitry causes the processor circuitry to determine whether a timing of the message transmission relative to the protected transmission window is authentic based on the PRN.

6. The computing apparatus of claim 1, the instructions when executed by the processor circuitry causes the processor circuitry to generate an alert of a possible timing synchronization attack based on a determination that a timing of the message transmission relative to the protected transmission window is not authentic.

7. The computing apparatus of claim 1, wherein the data stream is established in accordance with the Institute of Electrical and Electronics Engineers (IEEE) 802.1AS and/or 802.1Qbv standards.

8. A non-transitory computer-readable storage medium, the computer-readable storage medium including instructions that when executed by circuitry of a computer, cause the computer to:
receive a message during a protected transmission window of a data stream, wherein the protected transmission window is a communication window in which the message is transmitted;
generate a pseudo-random number (PRN); and
authenticate the message based on the PRN.

9. The non-transitory computer-readable storage medium of claim 8, the instructions when executed by the circuitry of the computer cause the computer to:
determine a delay time (DT) of a plurality of DTs of the message relative to the protected transmission window; and
determine whether the DT of the plurality of DTs is authentic based on the PRN.

10. The non-transitory computer-readable storage medium of claim 8, the instructions when executed by the circuitry of the computer cause the computer to:
identify a time buffer (TB) of a plurality of TBs of the message relative to the protected transmission window; and
determine whether the TB of the plurality of TBs is authentic based on the PRN.

11. The non-transitory computer-readable storage medium of claim 8, the instructions when executed by the circuitry of the computer cause the computer to:
generate a random sequence of bits based on the PRN; and
determine whether the message comprises the random sequence of bits.

12. The non-transitory computer-readable storage medium of claim 8, the instructions when executed by the circuitry of the computer cause the computer to determine whether a timing of the message transmission relative to the protected transmission window is authentic based on the PRN.

13. The non-transitory computer-readable storage medium of claim 8, the instructions when executed by the circuitry of the computer cause the computer to generate an alert of a possible timing synchronization attack based on a determination that a timing of the message transmission relative to the protected transmission window is not authentic.

14. The non-transitory computer-readable storage medium of claim 8, wherein the data stream is established in accordance with the Institute of Electrical and Electronics Engineers (IEEE) 802.1AS and/or 802.1Qbv standards.

15. A computing-implemented method, comprising:
receiving a message during a protected transmission window of a data stream, wherein the protected transmission window is a communication window in which the message is transmitted;
generating a pseudo-random number (PRN); and
authenticating the message based on the PRN.

16. The computing-implemented method of claim 15, authenticating the message based on the PRN comprising:
determining a delay time (DT) of a plurality of DTs of the message relative to the protected transmission window; and
determining whether the DT of the plurality of DTs is authentic based on the PRN.

17. The computing-implemented method of claim 15, authenticating the message based on the PRN comprising:
identifying a time buffer (TB) of a plurality of TBs of the message relative to the protected transmission window; and
determining whether the TB of the plurality of TBs is authentic based on the PRN.

18. The computing-implemented method of claim 15, authenticating the message based on the PRN comprising:
generating a random sequence of bits based on the PRN; and
determining whether the message comprises the random sequence of bits.

19. The computing-implemented method of claim 15, authenticating the message based on the PRN comprising:
determining whether the timing of the message transmission relative to the protected transmission window is authentic based on the PRN; and
generating an alert of a possible timing synchronization attack based on a determination that the timing of the message transmission relative to the protected transmission window is not authentic.

20. The computing-implemented method of claim 15, wherein the data stream is established in accordance with the Institute of Electrical and Electronics Engineers (IEEE) 802.1AS and/or 802.1Qbv standards.

* * * * *